Dec. 5, 1950 O. J. HUELSTER 2,533,115
FASTENER
Original Filed Aug. 7, 1943

INVENTOR.
Otto J. Huelster
BY
Dale A. Bauer
ATTORNEY

Patented Dec. 5, 1950

2,533,115

UNITED STATES PATENT OFFICE 2,533,115

FASTENER

Otto J. Huelster, Waterbury, Conn., assignor to Scovill Manufacturing Company, Waterbury, Conn., a corporation of Connecticut Original application August 7, 1943, Serial No. 497,721, now Patent No. 2,486,412, dated November 1, 1949. Divided and this application September 18, 1945, Serial No. 617,010

7 Claims. (Cl. 24—221)

This invention relates to fasteners, and more particularly to fasteners of the cam and stud type, one use of which is in aircraft for detachably securing such parts as cowlings, covers, and hoods to mounting structures. This application is a division of my co-pending application Serial No. 497,721, now Patent No. 2,486,412, issued November 1, 1949.

In general, such fasteners have two elements, one of which, a cam faced member, is fixedly attached to one part, and the other of which, a stud having a cross pin adapted to ride the cams into locking position, is attached rotatably to the other part. The studs are manufactured and kept in stock in various lengths to enable the fasteners to be used with parts of various thickness, but it is not infrequently the case that the correct size is out of stock or that a wrong size is chosen, resulting in waste of the time required to obtain a correct size, or in the assembly of parts that are unmatched to the thickness of the connected plates.

An even more important difficulty arises from the fact that the parts to be connected may not be perfectly aligned, a condition that is frequently found after hard use, and not infrequently occurs as a result of manufacturing errors or tolerances, and temperature changes. When misalignment is present, there is difficulty in bringing the stud into engagement with the cam, and if the parts to be fastened are curved, the difficulty is increased.

One of the objects of the present invention is to provide a novel cam and stud fastener having a stud of adjustable length adapted to fit parts of various thickness.

Another object of the invention is to provide a novel fastener which is so constructed that the laterally projecting elements of the stud, commonly referred to as the cross pin, may be moved relative to the head of the stud after assembly, so as to increase or decrease the effective length thereof and adapt the fastener to parts or plates of various thicknesses.

Another object is to provide a novel fastener which may be quickly engaged or released, even when the parts to be clamped or unclamped are not in exact alignment, and a particular object is to construct the cam element of the fastener with lateral adjustability sufficient to compensate for ordinary types of misalignment of parts.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

In the drawings, wherein like numerals refer to like parts throughout the several views, Fig. 1 is a sectional view, taken substantially on the line 1—1 of Fig. 2, of a fastening device embodying the present invention;

The present invention is illustrated, for example, in connection with a cowling plate and the frame of an airplane, portions of the plate and frame being indicated at 10 and 11, respectively, which are supposed to be axially in alignment with each other when said plate and frame are in assembled relation, but the opening 13 is larger in diameter than the opening 12, and the parts frequently become offset to such an extent that ordinary fasteners are not satisfactory.

Figure 1:
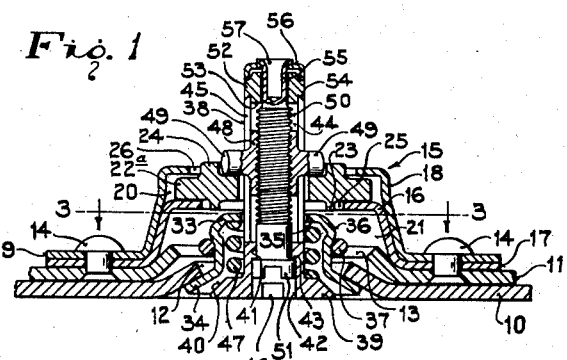

Secured to the inner surface of frame 11 as, for example, by rivets 14, and enclosing the opening 13 in said frame, is a socket indicated generally at 15 (Fig. 1). This socket 15 is formed by an inner, thin metal, cup-like shell 16 provided with a laterally extending flange 17, and an outer, thin metal, cup-like shell 18 provided with a laterally extending flange 19. The shells or plate-like supporting members 16 and 18 are of such construction that when said shells are nested to form the socket 15, space 20 (Fig. 1) is provided between the outer and inner shells 18 and 16, and the inner shell is offset and spaced from the plate 11 as indicated at 21.

Figure 2:
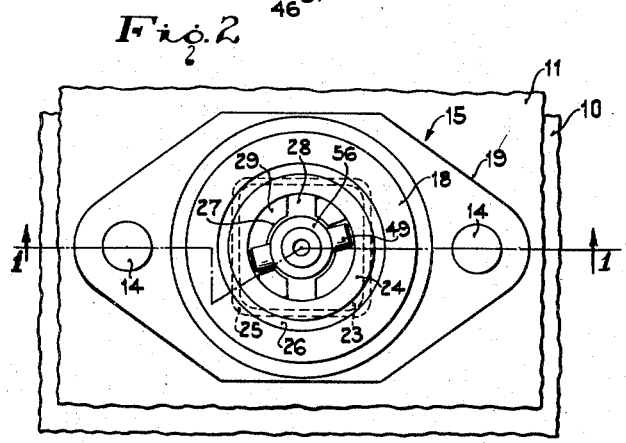
Fig. 2 is a plan view of the fastener in use.
Figure 3:
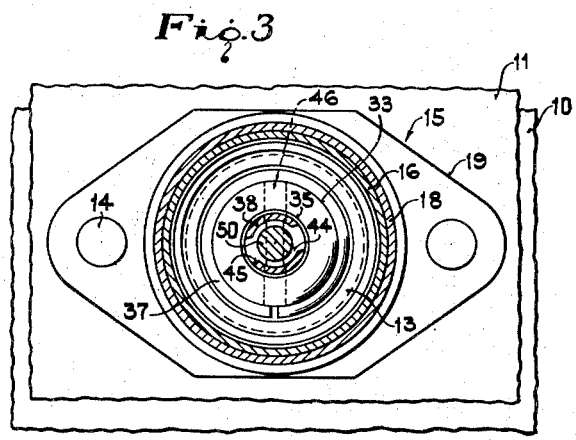
Fig. 3 is a horizontal section taken on the line 3—3 of Fig. 1.
Figure 4:
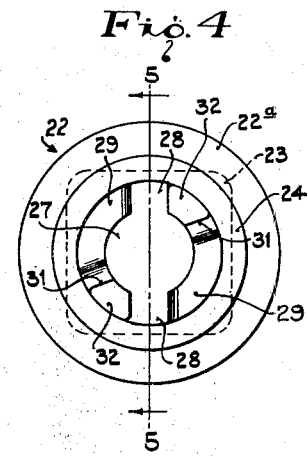
Fig. 4 is a plan view of the cam block shown in Fig. 1.
Figure 5:
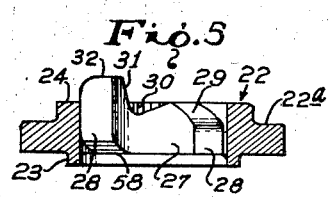
Fig. 5 is a section on line 5—5 of Fig. 4.

Disposed in the spaced mid-portions of space 20 between the shells 16 and 18 is the circular flange 22a of a cam block 22 which is provided on the lower side (as viewed in Fig. 1) with a square pad or flange 23, and on the upper with a circular flange or boss 24 (Fig. 1, 4 and 5). Flange 23 projects loosely into a square opening 25 formed in the inner shell 16, and boss 24 projects into a circular opening 26 formed in the outer shell 18 (Figs. 1 and 2). After the cam block is positioned between shells 16 and 18, the latter are secured together, preferably by spot welding to simplify handling thereof, but it will be understood that the shells may be secured together in any other suitable manner known in the art. The cam block 22 is held against rotation by square flange 23 but is adapted to slide or float in the space 20 in any direction parallel with the face of frame 11 until its motion is arrested by the contact of square flange 23 with the square opening 25 in shell 16.

Referring to Figs. 4 and 5 of the drawing, the floating cam block 22 is provided with a central opening 27, which is disposed in axial alignment with the opening 13 in the frame 11, with two diametrically opposite slots 28, and on the top side thereof and on opposite sides of slots 28 with a pair of diametrically opposite cam surfaces 29 which are inclined upwardly from said slots, are continued as diametrically opposite recesses 30, and terminate in abutments 31 formed by extensions 32 on said cam block which prevent the pin of the stud from being rotated beyond locking position in the recesses.

With the construction thus far described, it will be noted that the socket 15 and floating cam block 22 carried thereby constitute the cam assembly of the fastener fixed to the frame 11 of the airplane. The stud assembly of the fastening device, which cooperates with the floating cam block 22 for yieldingly clamping the detachable cowling plate 10 to frame 11, is carried by plate 10 and is constructed, mounted, and operated as follows:

Extending loosely through the drifted opening 12 in cowling plate 10 is a thin metal, spring retainer or cup member 33 with an outwardly depending skirt 34 that is inclined or tapered in conformity with the contour of the drifted hole 12 for direct engagement with the cowling plate. The spring retainer 33 is provided at its top or inner end with a central opening 35, and adjacent said end with an outwardly projecting annular bead 36 which is smaller in diameter than the opening 12 in the cowling plate 10 so that the retainer may easily be applied to said plate and quickly removed therefrom. Retainer 33 is held against displacement from cowling plate 10 by a split ring 37 which is engaged over said retainer between the annular bead 36 thereof and said cowling plate, and when so engaged is expanded to a diameter larger than the diameter of bead 36 and opening 12, but less than that of opening 13 in plate 11. The retainer is preferably made of a wear resisting metal, such as steel, and its use avoids the necessity for the usual eyelet to protect the surface of plate 10 adjacent opening 12.

Loosely carried by retainer 33 and projecting through the opening 35 therein is a stud 38 (Fig. 1) provided on its lower or outer end with an enlarged head 39 which is beveled, as at 40, to provide sufficient clearance between said head and the inner surface of the skirt 34. Stud 38 has formed therein a central opening 41 which is counterbored at its opposite ends to provide a shallow pocket 42 and a shoulder 43 at the bottom or outer end thereof, and with a deep pocket 44 at the top or inner end thereof. The stud 38 is further provided with two diametrically opposite slots 45 traversing the pocket 44 and extending the full length of said pocket. The head 39 of the stud 38 is slotted as indicated at 46 to receive a screw driver or other suitable tool for rotating the stud. Surrounding stud 38 and interposed between the stud head 39 and retainer 33 is a compression spring 47 for yieldably holding said retainer against cowling plate 10, and for yieldably applying clamping pressure to said stud. The spring retainer 33 and spring 47 extend into the space 21 provided by offsetting the central portions of the inner and outer shells away from their attaching portions.

Fitted for sliding movement within and along the pocket 44 in the stud 38 is an internally threaded, cylindrical nut or sleeve 48 having secured thereto, or formed integrally therewith, two laterally extending pins 49 which project through the slots 45 in said stud. Sleeve 48 and its pins 49 constitute a cross-pin member. The distance between the outer ends of the cross pins 49 is less than the diameter of the opening 12 in the cowling plate 10, and slightly less than the distance between opposite ends of the slots 28 in cam block 22 to permit said pins to freely pass through said opening and slots.

Arranged within the pocket 44 in the stud 38 is a screw 50 having threaded engagement with sleeve 48. This screw 50 extends through opening 41 in stud 38 and is provided on its lower or outer end with an enlarged slotted head 51 which is disposed within the pocket 42 and abuts against the shoulder 43. Since sleeve 48 is held against rotation relative to the stud 38 by the pins 49 engaged in slots 45, rotation of the screw 50 will cause the cross-pin member 48, 49 to move axially along the stud 38, increasing or decreasing the distance between said pins and the head 39 of said stud in accordance with the direction of rotation of the screw.

Figure 6:
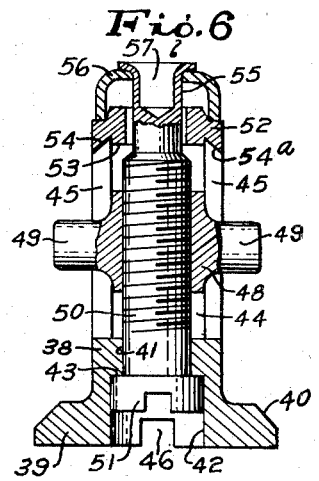
Fig. 6 is an enlarged showing of the stud and the elements carried thereby, the view being taken substantially on the line 1—1 of Fig. 2.

To prevent spreading or contracting of the walls of the stud 38 surrounding the pocket 44 which would result in excess play or binding of the nut or sleeve 48 in said pocket, the stud 38 has engaged therewith at its top or inner open end a friction bushing 52. This friction bushing 52 is provided on its lower end, as viewed in Fig. 6, with a reduced portion 53 which extends into the pocket 44, and with a beveled or tapered groove 54 that engages the corresponding beveled or tapered upper end 54a of the stud 38.

The bushing 52 is connected with adjusting screw 50 for rotation therewith relative to stud 38, and by reason of the frictional relationship at surfaces 54, 54a the bushing 52 will also rotate with stud 38, screw 50 and cross-pin member 48, 49 as a unit when said stud is rotated. As shown, screw 50 is formed at its upper end with a reduced neck portion 55 which extends through a suitable opening formed in bushing 52, and also through a suitable opening formed in a resilient bearing cap 56 engaged with said bushing. The bearing cap 56 is held in engagement with bushing 52, and the latter is held in frictional contact with the stud 38 by flanging or turning the end of the reduced neck portion 55 over the bearing cap 56, said neck portion 55 being bored out, as indicated at 57, to provide a thin wall for this purpose. The frictional contact of the bushing 52 with the end of stud 38 at surface 54 is sufficient to prevent any accidental relative rotation of stud 38 and adjusting screw 50 and, hence, any accidental rotation of nut 48, 49 from a preadjusted position on screw 50. Bearing cap 56 is preferably forced over the upper reduced end of bushing 52 by a drive fit to obtain a non-rotatable connection between said cap 56 and bushing 52. It will be noted that frictional rotation can take place between beveled surfaces 54, 54a which serve the double function of providing an increased bearing surface whereby a higher degree of friction is obtained and, since the stud 38 is split for a major portion of its length by slots 45, holding the upper split ends of said stud (Fig. 6) against lateral spreading movement.

The socket 15 with the floating cam block 2 having been secured to the frame 11, and the spring retainer 33, spring 47, and stud 38 with the adjustable cross pins 49 having been attached to the cowling 10, as hereinbefore described, said cowling is now in readiness to be yieldingly and detachably clamped to said frame, as follows: Assuming that the cross pin member 48, 49 has been properly positioned along the stud 38 in accordance with the thickness of plate 10 and frame 11, the stud 38 is inserted into the opening 27 in the cam block 22 and rotated as a unit in either direction until the cross pins 49 are in line with and pass through the slots 28 in said cam block. Preferably cross pin member 48, 49 is passed through opening 27 and slots 28 in cam block 22 by rotating stud 38 in a counterclockwise direction as viewed in Figs. 2 and 4. Pins 49 will be thus rotated against the underside of cams 29, 30, 31, which directly below the extensions 32 as viewed in Figs. 4 and 5, are preferably rounded as at 58 (Fig. 5) whereby pins 49, moving along said surfaces 58, freely enter slots 28 in a plane above the underside of the cam surfaces opposite the portions designated by the reference character 29. Thus any effort to move pins 49 past slots 28 in a counterclockwise direction, as viewed in Figs. 2 and 4, causes said pins to engage the diametrically opposite ends of cams 29, 30, 31 so that the user knows that his pins 49 are now in alignment with the slots and he readily passes stud 38 with the cross pin member 48, 49 through opening 27 and slots 28. Stud 38 is then rotated by a screw driver, or other suitable tool, causing the cross pins 49 to ride up and along the cam surfaces 29 against the tension of the compression spring 47, and snap into the recesses 30 and into engagement with the abutments 31. The cowling 10 will thus be yieldingly but firmly clamped against frame 11, and the stud 38 due to engagement of the cross pins 49 in the recesses 30 will be held against accidental rotary movement.

If the openings 12 and 13 in the cowling plate 10 and frame 11 are not in proper alignment, the stud 38 upon first entering the opening 27 in the cam block 22 will cause said cam block to float or move to a position, within prescribed limits, where the opening 27 thereof is in axial alignment or substantially so with said stud, thus enabling the stud 38 and cross pins 49 to enter and pass through the opening 27 and slots 28, respectively, in the cam block 22.

Should it be desired to positively lock the stud 38 against movement after the cowling 10 is clamped in position, this can be accomplished by rotating adjusting screw 50 with the aid of a screw driver, or other suitable tool, in a direction to cause the head 39 of the stud to move toward the cross pins 49, compressing the spring 47 to such an extent that the further compressibility of the spring is less than the distance between the bottom of the recesses 30 and the high points of portions 29 of the cam surfaces.

The stud 38 can be removed from the cowling 10 for repair or replacement by retracting sleeve 48 through the rotation of screw 50, disengaging pins 49 through the rotation of stud 38, removing plate 11, and removing ring 37, whereupon retainer 33, spring 47, and stud 38 may be removed from the cowling as a single unit.

It will thus be seen that due to the adjustability of the cross pins 49 along the stud 38, a fastening device is provided which will accommodate all thicknesses of plates within the range of adjustment of said cross pins, and while the stud 38 with the adjustable cross pins 49 is herein illustrated and described in cooperation with a floating cam block 22, said stud and adjustable cross pins are equally adaptable for use with a fastening device wherein the cam or cam block is secured to or forms an integral part of the socket.

Due to the provision of the floating cam block 22, irregularities within prescribed limits in the alignment of the plate openings are automatically compensated for, and while said type of cam block is herein illustrated and described in association with adjustable cross pins, it is equally adaptable for use in association with a cross pin or cross pins that are secured to or form an integral part of the stud.

It is, therefore, to be expressly understood that while one embodiment of the present invention is herein illustrated and described with more or less particularity, said invention is not limited to said embodiment or otherwise than by the terms of the appended claims.

What is claimed is:

1. In a fastener of the cam and stud type, a cam block, a boss projecting from said block, a polygonal flange projecting from the surface of the block opposite the boss, nested shells having offset, spaced mid-portions adapted to receive the said cam block, the outer of said shells having an opening adapted to adjustably receive said boss, the inner of said shells having a polygonal opening adapted to receive said polygonal flange and of such size and shape that adjustment of the block within the spaced portions of the shells is permitted but rotation thereof is prevented.

2. In a fastener of the cam and stud type, a cam block having a slot, a boss projecting from one face of said block, a rounded face formed near the end of said slot in the other face of said block adapted to guide a locking pin into the slot, a polygonal flange projecting from the opposite surface of the block, nested shells adapted to receive the said cam block having abutting rims adapted to be attached to a supporting member, the outer of said shells having an opening to adjustably receive said boss, and the inner of said shells having an opening to receive said polygonal flange of such size and shape that adjustment of the block within the spaced portions of the shells is permitted but rotation thereof is prevented.

3. In a fastener of the cam and stud stype, a cam block having a slot, an annular boss surrounding said slot, rounded faces formed at the ends and at opposite sides of said slot adapted to guide a locking pin into the slot, a substantially rectangular flange projecting from the block and surrounding the slot and the said rounded faces, nested shells having abutting rims adapted to be attached to a plate and having offset, spaced mid-portions adapted to receive the said cam block, the outer of said shells having an opening adapted to receive the boss and to permit adjustment thereof, the inner of said shells having a substantially rectangular opening adapted to receive said rectangular flange and of such size that adjustment of the block within the spaced portions of the shells is permitted but rotation thereof is prevented.

4. In a fastener of the cam and stud type, a cam block having an elongated slot, an annular boss surrounding said slot, rounded faces formed at opposite ends and at opposite sides of said slot adapted to guide a locking pin into the slot, a substantially rectangular flange projecting from the block and surrounding the slot and the said rounded faces, nested shells having abutting rims adapted to be attached to a plate and having offset, spaced mid-portions adapted to receive the said cam block, the outer of said shells having an opening adapted to receive said boss and to permit movement thereof in any direction, the inner of said shells having a substantially rectangular opening adapted to receive said rectangular flange and of such size that adjustment of the block within the spaced portions of the shells is permitted but rotation thereof is prevented.

5. In a fastener of the cam and stud type, a cam block having an elongated slot extending therethrough, an annular boss encircling the said slot, rounded faces formed at opposite ends and at opposite sides of said slot in the other surface of said block adapted to guide the pins of a stud into the slot, a non-circular flange projecting from the said other surface of the block and surrounding the slot and the said rounded faces, and nested shells having abutting rims adapted to be attached to a plate and having offset, spaced mid-portions adapted to receive the said cam block, the outer of said shells having a circular opening of greater size than the said annular boss adapted to receive said boss, the inner of said shells having a non-circular opening adapted to receive said non-circular flange and of such greater size that adjustment of the block within the spaced portions of the shells is permitted but rotation thereof is prevented.

6. In a fastener of the cam and stud type, cam means having a flange, and inner and outer shells having attaching portions for securing the shells to a supporting member, said shells having central portions offset from the attaching portions and spaced from each other to provide for a cam space, and which central portions are provided with openings through which portions of the cam means loosely extend with the flange slidably positioned in said space, one portion of the cam means being adapted to engage the walls of one of said openings to prevent rotation of the cam means relative to the shells.

7. A locking device, comprising in combination with a cover plate, and a base plate, a latching member having inclined surfaces adapted to be pressed by a locking bar in the course of its locking and unlocking movements, and having recesses adapted to receive said locking bar in its unlocked and locking positions, a locking frame enclosing said latching member, means engaging said locking frame and said base plate and firmly connecting said locking frame to said base plate, and a resilient disc located between said base plate and said latching member, and bearing on both, said disc being subjected to bending pressure in the course of said locking and unlocking movements.

OTTO J. HUELSTER.

REFERENCES CITED

The following references are of record in the file of this patent:

UNITED STATES PATENTS

| Number | Name | Date |
|---|---|---|
| 2,238,865 | Purinton | Apr. 15, 1941 |
| 2,327,331 | Pender | Aug. 17, 1943 |
| 2,337,483 | Marty | Dec. 21, 1943 |
| 2,356,162 | Johnson et al. | Aug. 22, 1944 |
| 2,372,496 | Huelster | Mar. 27, 1945 |